United States Patent [19]
Thiel et al.

[11] Patent Number: 4,736,822
[45] Date of Patent: Apr. 12, 1988

[54] BRAKE PAD RETENTION SPRING, IN PARTICULAR FOR SPOT-TYPE DISC BRAKES FOR AUTOMOTIVE VEHICLES

[75] Inventors: Rudolf Thiel, Frankfurt am Main; Ulrich Klimt, Muehltal; Dalibor Zaviska, Frankfurt am Main, all of Fed. Rep. of Germany

[73] Assignee: Alfred Teves GmbH, Frankfurt Am Main, Fed. Rep. of Germany

[21] Appl. No.: 889,219

[22] Filed: Jul. 25, 1986

[30] Foreign Application Priority Data

Sep. 11, 1985 [DE] Fed. Rep. of Germany ....... 3532373

[51] Int. Cl.4 ............................................. F16D 65/02
[52] U.S. Cl. .................................................. 188/73.32
[58] Field of Search ............... 188/73.35, 73.36, 73.37, 188/73.38, 205 A, 73.32; 192/30 V

[56] References Cited

U.S. PATENT DOCUMENTS

| | | | |
|---|---|---|---|
| 4,305,484 | 12/1981 | Bradley | 188/73.32 |
| 4,467,897 | 8/1984 | Kubo et al. | 188/73.38 |
| 4,527,668 | 7/1985 | Davidson | 188/73.38 |
| 4,560,037 | 12/1985 | Gumkowski | 188/73.38 |

FOREIGN PATENT DOCUMENTS

| | | | |
|---|---|---|---|
| 2211013 | 9/1973 | Fed. Rep. of Germany ... | 188/73.38 |
| 17234 | 2/1983 | Japan | 188/73.37 |

Primary Examiner—Randolph A. Reese
Assistant Examiner—Anthony Knight
Attorney, Agent, or Firm—James B. Raden; Robert P. Seitter

[57] ABSTRACT

A brake pad retention spring for spot-type disc brakes for automotive vehicles is disclosed including a fastening section for securing the spring to a pad backing plate and three spring arms for engagement into a brake member such as a brake piston wherein two of the spring arms extend substantially in a circumferential direction relative to the brake disc and the third spring arm extends substantially in a radial direction. In order to permit radial pad replacement with comparatively thin pads with the housing in its mounted position, the invention provides for the radial spring arm to have a bent section extending substantially parallel to the backing plate and having an adjacent end section extending substantially radially.

8 Claims, 2 Drawing Sheets

4,736,822

BRAKE PAD RETENTION SPRING, IN PARTICULAR FOR SPOT-TYPE DISC BRAKES FOR AUTOMOTIVE VEHICLES

BACKGROUND OF THE INVENTION

This invention relates to a brake pad retention spring, and in particular for spot-type disc brakes for automotive vehicles.

A retention spring of the general type referred to above is shown in the Brake Handbook of ALFRED TEVES GMBH, Bartsch-Verlag, Ottobrunn, 8th new edition, page 201. This known retention spring serves to hold the brake pad against a brake member, and in particular against the brake piston, without clearance. The known spring has, however, certain disadvantages in respect to assembly and function. its large overall depth or thickness is a particular disadvantage in that a pad radial replacement operation, which permits the inboard brake pad which is provided with such a retention spring to be assembled with the caliper in its mounted position, is possible only if the thickness of the outboard brake pad is greater than the thickness or depth of the spring. Typically, such a spring is required to be up to about 25 mm in depth to properly perform its function, and even sliding calipers allow such pad replacement only in limited cases. Further, heretofore the use of such a retention spring has often required components such as brake carrier members, for example, which obstruct radial pad assembly, to be recessed or relocated inwardly to such an extent that the direction of the application of braking forces may be adversely affected developing additional bending moments.

SUMMARY OF THE INVENTION

It is, therefore, an object of this invention to provide for a brake pad retention spring which allows for the use of brake pads of conventional thin thickness and which affords a simple way of changing the brake pads radially while the housing is in its mounted position.

According to the invention, a disc brake pad retention spring which avoids the above-mentioned drawbacks is provided including a radially extending spring arm.

According to a preferred embodiment of the invention, the spring produces the same spring force as known springs having spring arms about twice the length of the arms of the spring according to the invention. Accordingly, the spring permits a substantial reduction of the overall thickness of the spring so that the brake pads of a thickness of only about 11 mm can be fitted radially without the holding function of the spring being impaired.

According to the preferred embodiment, a force component is applied by the radial arm of the spring causing the brake pad to be biased into abutment with the brake caliper, thereby eliminating the tendency of the pad to rattle, wiich otherwise occurs due to the clearances developing as a result of tolerances of the individual components.

An important feature of the invention provides for two spring arms exending in a circumferential direction and which substantially function to hold the brake pad against the appropriate brake component such as the piston of the brake.

According to a further important aspect of the invention, the radial spring arm applies the spring force necessary to keep the pad biased in abutment with the caliper or the brake carrier. In this arrangement, the spring forces of the radial and the two other spring arms have to be coordinated so as to provide a low total bias force on the pad enabling the brake pad to be displaced parallel to the plane of the pad backing plate.

In accordance with another advantageous embodiment of the invention, the middle portion of a bent, S-shaped, section extends substantially in the circumferential direction. In this embodiment, the S-shaped bent section is suitably arranged in the region of one of the two spring arms which extend in the circumferential direction or at a central fastening section of the retention spring adjacent to one of the two circumferentially orientated spring arms, which enables the S-shaped section to be of a substantially broad construction without requiring additional space. The S-shaped section is a necessary component of the spring which functions to increase the security of the pad and enables the spring to withstand the stress and force of a larger spring. The third spring arm utilizes an "S-shape" to enable it to function, as the aforementioned reasons indicate, in a limited amount of space.

In accordance with another advantageous embodiment, the spring arms extending in the circumferential direciton are arranged at an angle relative to a tangential plane which angle is substantially in the range of between 5° and 15°. By virture of this configuration, the two circumferentially orientated spring arms support the radially acting spring arm since they invariably tend to force the brake pad downward in the direction of the force of the bent spring arm. The two spring arms reinforce the radially acting spring arm without impairing the resilience due to an increase in resistance because the frictional resistance is compensated for by the inclined position of the two circumferentially orientated spring arms. In the known retention spring, even a minor off-center condition of the spring presents the risk of a spring arm becoming bent and folded outwardly. Bending the spring arm back may cause it to eventually break.

Therefore, a still further advantageous feature of the invention provides for bending of the end portions of the spring arms toward the backing plate of the brake pad. This configuration makes it more difficult for the spring arms to become bent and jammed at the brake piston. In addition, this arrangement facilitates the insertion of the retention spring into the brake piston.

Since the bearing spots of the present known retention spring on the brake piston are not well defined in the region of the spring arms, poor seating in the piston may result and consequently an inaccurate definition of spring movement ansd spring force can result.

In accordance with a further important feature of the invention, therefore, the portions of the spring arms abutting the piston are suitably profiled, and in particular are bulged, and conform to the curvature of the piston such that only a point or line contact is established between the spring arms and piston. This structure improves the slip between the spring arms and piston during assembly by reducing resistance otherwise due to cutting by the spring arm edges into the piston and the seating of the edges in the piston. The three defined bearing spots according to the invention results in low fluctuations which is of particular importance for the spring arms extending in the circumferential direction in order to maintain the angular range identified above.

A still further feature provides for the claw-type spring to be secured to the backing plate by means of notched nails, rivets, screws, caulking or spot-welding or the like. Additional means to secure the brake pad in its position is not required. Even should a spring arm break, the pad will continue to be held captive by the remaining spring portions.

BRIEF DESCRIPTION OF THE DRAWINGS

The invention will now be described in the following Detailed Description of the Preferred Embodiment with reference to the accompanying drawings in which.

DETAILED DESCRIPTION OF THE PREFERRED EMBODIMENT

Figure 1:
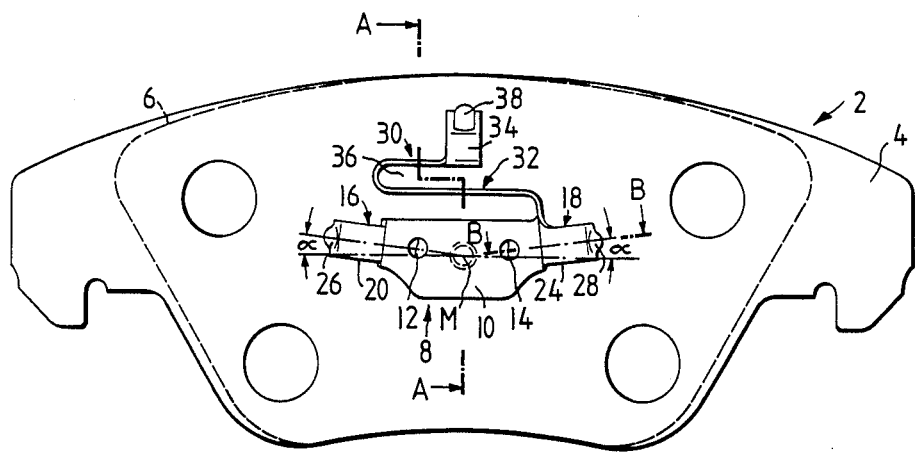
FIG. 1 is a view of the rear side of a brake pad provided with a retention spring according to the invention.
Figure 2:
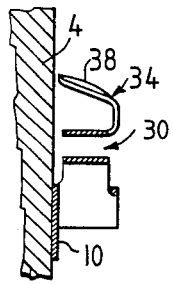
FIG. 2 is a sectional view of the retention spring of FIG. 1, taken along the line A—A of FIG. 1 showing details of the spring.
Figure 3:
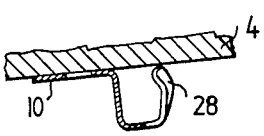
FIG. 3 is a sectional view of the retention spring of FIG. 1, taken along the line B—B of FIG. 1 showing further details of the spring.

Referring now to FIGS. 1, 2 and 3 of the drawing, there is illustrated a brake pad 2 for a spot-type disc brake which has a metallic backing plate 4 with the actual friction lining 6 (shown in broken lines) affixed to its front side. A retention spring 8 is secured to the backing plate 4.

The retention spring 8 has a substantially rectangular fastening section 10 whose lower corners are cut off. The fastening section 10 has two through holes 12, 14 serving to secure the retention spring 8 to the backing plate 4. For this purpose, notched nails, rivets, screws and the like are suitably used. Other fastening methods such as caulking or spot-weling or the like may also be applied.

Extending from the sides of the fastening section 10 are two spring arms 16, 18 having their central axis extending through the center point M at an angle relative to the tangential plane which is essentially in the range of between 5° and 15° and preferably being about 7°. The spring arms 16, 18 are bent in several places, forming a substantially U-shaped end section 20, 24, as shown best in the sectional view of FIG. 3 illustrating the spring arm 18. The extreme ends of the end sections 20, 24 extend toward the backing plate 4, forming another angle of about 30°. In the region of these angles, they are profiled as at 26, 28 to provide defined bearing spots.

A third spring arm 30 has a bent, S-shaped section 32 continuing in a radially extending end section 34. The S-shaped section 32 begins adjacent to the fastening section 10 in the region of the spring arm 18. In the manufacture of the retention spring 8 in which the U-shaped end section 24 of the spring arm 18 is formed by bending over, the portion forming the S-shaped section 32 lies in a plane extending substantially perpendicular to the plane of the fastening section 10. The middle portion 36 of the S-shaped section 32 extends substantially in the circumferential direction of the brake caliper, approximately over the width of the fastening section 10. Similar to the end sections of the spring arms 16, 18, the end section 34 of the spring arm 30 is likewise bent in several places as shown in sectional view of FIG. 2, with its end being substantially of U-shape and having its extreme end extending in the direction of the backing plate and profiled as at 38.

Figure 4:
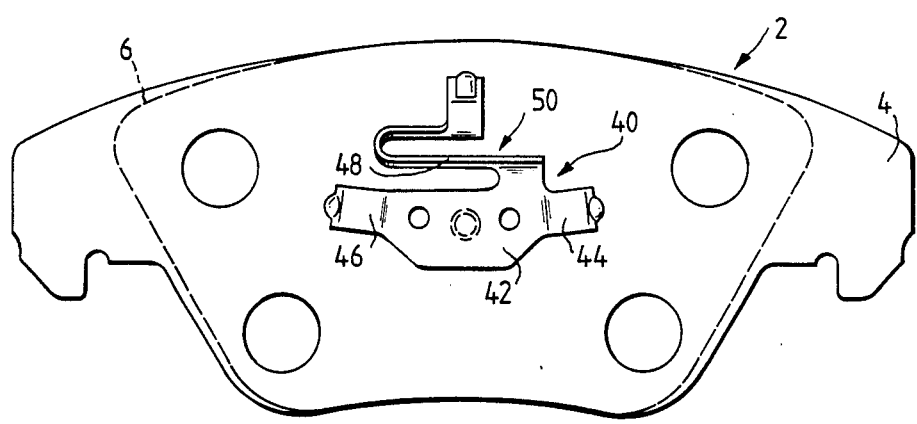
FIG. 4 is a view of the rear side of a brake pad provided with a retention spring according to an alternative embodiment.

In the embodiment of FIG. 4, a retention spring 40 is provided which is substantially identical to the retention spring 8 in respect of its fastening section 42 and the circumferentially extending arms 44, 46. In constrast to the retention spring 8, however, the bent portion 48 of the radially extending spring arm 50 is provided in the region of the fastening section 42, which results in a different spring excursion for this particular arm.

Since, among other things, the retention springs of the invention are to permit a displacement of the brake pad, it may be useful to introduce suitable means to reduce the friction of that area of the pad backing plate which is held against the appropriate brake member by means of the spring. For this purpose, a piece of sheet metal may be used which rests on the backing plate underneath the retention spring and is secured to the retention spring.

What is claimed is:

1. A brake pad retention spring for a spot-type disc brake for an automotive vehicle, comprising a fastening section adapted to be secured to a pad backing plate, a pair of spring arms adapted to engage into a brake member of the disc brake wherein said pair of spring arms each extend from said fastening section in substantially opposite circumferential directions in relation to a brake disc of said disc brake, and a third spring arm extends from said fastening section in substantially a radial direction in relation to said brake disc, said third spring arm includes a bent section having a bend therein, which bend is contained within a plane substantially parallel to the backing plate, said bend defining an adjacent end section extending substantially in said radial direction.

2. The retention spring as claimed in claim 1, wherein a middle portion of the bent section extends substantially in the circumferential direction.

3. The retention spring as claimed in claim 1, wherein the bent section is arranged in a region proximate one of said pair of spring arms and extends from said region in the circumferential direction.

4. The retention spring as claimed in claim 1, wherein the bent section is arranged at the fastening section adjacent to a one of said pair of spring arms and extends from said fastening section in the circumferential direction.

5. The retention spring as claimed in claim 1, wherein each of the pair of spring arms extending in the circumferential direction are arranged at an angle relative to a tangential plane through a center of said fastening section which is substantially in the range of between 5° and 15°.

6. The retention spring as claimed in claim 1, wherein end portions of each of the pair of spring arms and of the third spring arm are bent toward the backing plate.

7. The retention spring as claimed in claim 6, wherein each of the end portions are profiled to define substantially spot-control bearings.

8. The retention spring as claimed in claim 1, wherein said bent section is substantially S-shaped and has a width corresponding substantially to the width of the fastening section.

* * * * *